(12) United States Patent
Shinohara

(10) Patent No.: US 7,441,009 B2
(45) Date of Patent: Oct. 21, 2008

(54) COMPUTER SYSTEM AND STORAGE VIRTUALIZER

(75) Inventor: Atsushi Shinohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 11/277,648

(22) Filed: Mar. 28, 2006

(65) Prior Publication Data

US 2007/0150590 A1     Jun. 28, 2007

(30) Foreign Application Priority Data

Dec. 27, 2005   (JP)   ............................... 2005-375506

(51) Int. Cl.
*G06F 15/16*     (2006.01)
(52) U.S. Cl. ................... 709/215; 709/214; 711/170
(58) Field of Classification Search ......... 709/200–202, 709/214–215; 711/203, 147, 148, 152, 170
See application file for complete search history.

(56) References Cited

U.S. PATENT DOCUMENTS

| | | | |
|---|---|---|---|
| 7,054,266 B2* | 5/2006 | Shimozono et al. | |
| 7,203,814 B2* | 4/2007 | Serizawa et al. | |
| 7,257,694 B2* | 8/2007 | Serizawa et al. | |
| 7,334,106 B2* | 2/2008 | Serizawa et al. | |
| 2003/0172149 A1* | 9/2003 | Edsall et al. | 709/224 |
| 2005/0025045 A1* | 2/2005 | Shimozono et al. | 370/225 |
| 2005/0076157 A1* | 4/2005 | Serizawa et al. | 710/1 |
| 2005/0198186 A1* | 9/2005 | Griv | 709/212 |
| 2005/0228950 A1* | 10/2005 | Karr | |
| 2005/0235132 A1* | 10/2005 | Karr et al. | |
| 2006/0107017 A1* | 5/2006 | Serizawa et al. | |
| 2006/0112251 A1* | 5/2006 | Karr et al. | |
| 2006/0129877 A1* | 6/2006 | Yamamoto et al. | |
| 2006/0212751 A1* | 9/2006 | Yamamoto et al. | |
| 2006/0224799 A1* | 10/2006 | Maki et al. | |
| 2007/0043925 A1* | 2/2007 | Serizawa et al. | |
| 2007/0255925 A1* | 11/2007 | Serizawa et al. | |

FOREIGN PATENT DOCUMENTS

| | | |
|---|---|---|
| JP | 2003-44421 | 2/2003 |
| JP | 2005-78507 | 3/2005 |

* cited by examiner

*Primary Examiner*—Moustafa M Meky
(74) *Attorney, Agent, or Firm*—Staas & Halsey LLP

(57) ABSTRACT

The computer system is capable of setting centralized modules so as to make most of access requests to a virtual storage unit correspond to physical storage units assigned to a centralized module, which receives the requests. The computer system comprises a storage virtualizer having: a unit for selecting a centralized module, which is assigned to deal with the storage areas of the physical storage units having the maximum storage capacity for the storage area of the corresponding virtual storage unit; and a unit for assigning the centralized module selected by the selecting unit as the object centralized module, to which the virtualization unit sends the access request.

10 Claims, 5 Drawing Sheets

COMPUTER SYSTEM AND STORAGE VIRTUALIZER

BACKGROUND OF THE INVENTION

The present invention relates to a storage virtualizer, which produces a virtual storage unit with a part or the whole of storage areas of physical storage units and which is capable of accessing to a host computer, and a computer system using the storage virtualizer.

In a large scale computer system for mass-processing data, a plurality of storage units, e.g., magnetic disk units, are often connected to a host computer, e.g., server computer, by a proper connecting manner, e.g., fiber channels, so as to allow the host computer to flexibly use the storage units.

A conventional computer system having host computers 11a and 11b and a storage system 13, which includes physical storage units X, Y and Z, is shown in FIG. 3.

In FIG. 3, the storage system 13 includes centralized modules CM1 and CM2 for accessing to the physical storage units X, Y and Z. The centralized modules are respectively assigned to the physical storage units X, Y and Z. For example, the centralized module CM1 is assigned to the physical storage units X and Y; the centralized module CM2 is assigned to the physical storage unit Z. Note that, paths from the physical storage units to the centralized modules assigned are shown as solid lines; paths from the physical storage units to the centralized modules not assigned are shown as dotted lines.

The centralized modules CM1 and CM2 respectively have cache memories corresponding to stored contents of the designated physical storage units, so that they can rapidly access to the designated physical storage units by using the cache memories.

When the centralized module CM1 receives an access request to the designated physical storage unit X or Y via the paths 17 and 19 connected to the host computers 1a and 11b, it accesses to the physical storage unit X or Y.

When the centralized module CM1 receives an access request to the physical storage unit Z designated to the other centralized module CM2 via the paths 17 and 19, it sends the request to the assigned centralized module CM2. Namely, the centralized modules CM1 and CM2 communicate each other so as to transfer the request to the centralized module CM2.

In the storage system 13, the assigned centralized module always accesses to the designated physical storage unit.

As shown in FIG. 3, the centralized modules CM1 and CM2 are connected to the physical storage unit not designated via the paths shown by dotted lines. For example, when the centralized module CM1 breaks down, the physical storage unit X can be accessed via the centralized module CM2.

In the computer system shown in FIG. 3, when the host computers 11a or 11b accesses to the physical storage unit X, Y or Z, its device driver sends the access request to the assigned centralized module of the physical storage unit to be accessed. With this action, transferring the request between the centralized modules CM1 and CM2 can be omitted, so that the access time can be shortened.

In the conventional computer system including a plurality of physical storage units, storage areas of the physical storage units are combined so as to make a host computer recognize as a virtual storage unit.

An example of such computer system employing the virtual storage unit is disclosed in Japanese Patent Gazette No. 2003-44421. The computer system is shown in FIG. 4. A plurality of node units (host computers) 1 and a plurality of storage units 2 are connected by a network switch 3. A network processor 31 of the network switch 3 combines a part or a whole of a storage area of each storage unit 2 so as to constitute a virtual storage unit (virtual common disk) 5. The node units 1 are capable of accessing to the virtual storage unit 5.

By the virtualization of the storage, a user can optionally produce the virtual storage unit on the basis of uses of the host computer. By accessing to the virtual storage unit, the host computer can use the physical storage units without regard to storage capacities and connection types of the physical storage units.

Another conventional computer system, in which the storage system 13 shown in FIG. 3 is used to virtualize storages, is shown in FIG. 5.

In FIG. 5, the host computers 11a and 11b and the centralized modules CM1 and CM2 of the storage system 13 are respectively connected to a fiber channel switch 10, which acts as a storage virtualizer, via connecting means 12a-12j and fiber channels (FC).

The fiber channel switch 10 produces virtual storage units A and B by combining parts or the whole of storage areas of the physical storage units X, Y and Z. The host computers 11a and 11b recognize the virtual storage units A and B. The host computers 11a and 11b can access to the virtual storage units A and B as well as the ordinary physical storage units.

In FIG. 5, the fiber channel switch 10 combines a part x1 of the physical storage unit X, a part y1 of the physical storage unit Y and a part z1 of the physical storage unit Z so as to produce the virtual storage unit A; the fiber channel switch 10 combines a part x2 of the physical storage unit X, a part y2 of the physical storage unit Y and a part z2 of the physical storage unit Z so as to produce the virtual storage unit B. The host computer 11a and 11b is capable of accessing to the virtual storage units A and B independently.

The structure of the fiber channel switch 10 acting as the storage virtualizer is not limited to the example shown in FIG. 5. Parts or the whole of storage areas of the physical storage units may be optionally combined to produce the virtual storage unit.

In the computer system shown in FIG. 5, when the storage virtualizer (fiber channel switch) requests to access to the physical storage unit (physical hard disk unit) in answer to the access of the host computer to the specific virtual storage unit, the access request is sent to the specific centralized module.

In case that one virtual storage unit is constituted by storage areas of a plurality of physical storage units, if the access request is sent to a plurality of centralized modules, consistency of access order between the access request and another access request sent from another host computer cannot be ensured. Further, data stored in the physical storage units may be damaged. The storage virtualizeer designates the centralized module for the physical storage unit to be accessed in answer to each access to the virtual storage units and distributes the access requests to the centralized modules. With this action, overload must be applied to firmwares of a control section.

In the computer system shown in FIG. 5 and the storage virtualizer thereof, when the host computer accesses to one virtual storage unit, the access request is sent to the predetermined centralized module corresponding to the virtual storage unit. Therefore, the centralized module, to which the access request is sent, works as the assigned centralized module or the nonassigned centralized module according to the physical storage units corresponding to the storage areas of the virtual storage unit.

For example, in FIG. 5, if the access request to the virtual storage unit A is sent via the centralized module A, the access request to the storage areas x1 and y1 of the virtual storage unit A is sent to the designated centralized module CM1; the access request to the storage area z1 is sent to the nondesignated centralized module CM1 then transferred to the centralized module CM2.

In the conventional computer system, if many access requests to the virtual storage unit are sent to the centralized module which is not designated to the corresponding physical storage unit, the transfer of the requests occur many times. Therefore, a speed of accessing to the storage system must be slower For example, in FIG. 5, if number of times of accessing to the storage areas y2 and z2 is larger than number of times of accessing to the storage area x2, many of the access request are transferred from the centralized module CM1 to the centralized module CM2, so that access performance must be lowered.

SUMMARY OF THE INVENTION

The present invention was conceived to solve the above described problems.

An object of the present invention is to provide a computer system and a storage virtualizer, which is capable sending many of access requests to an object centralized module, which is assigned to a virtual storage unit corresponding to physical storage units to be accessed on the basis of the access requests.

To achieve the objects, the present invention has following structures.

Namely, the computer system comprises a host computer, a storage system including a plurality of physical storage units and a plurality of centralized modules respectively accessing to the assigned physical storage units, and a storage virtualizer having: a plurality of connecting means for connecting to the host computer and the centralized modules; virtualization means producing at least one virtual storage unit by a part or the whole of storage areas of the physical storage units and allowing the host computer to access to the virtual storage unit, the virtualization means sending an access request to one of the centralized modules so as to access to the storage areas of the physical storage units corresponding to an access area of the virtual storage unit when the host computer accesses to the virtual storage unit; means for selecting the centralized module, which is assigned to deal with the storage areas of the physical storage units having the maximum storage capacity for the storage area of the corresponding virtual storage unit, for the virtual storage unit; and means for assigning the centralized module selected by the selecting means as the object centralized module, to which the virtualization means sends the access request, for the virtual storage unit.

With this structure, the assigning means assigns the centralized module selected by the selecting means as the object centralized module, to which the virtualization means sends the access request and which is assigned to deal with the storage areas of the physical storage units having the maximum storage capacity for the storage area of the corresponding virtual storage unit. Therefore, most of the access requests can be corresponded to the storage areas corresponding to the assigned centralized module.

Another computer system comprises a host computer and a storage system including a plurality of physical storage units, a plurality of centralized modules respectively accessing to the assigned physical storage units, and a storage virtualizer having: a plurality of connecting means for connecting to the host computer and the centralized modules; virtualization means producing at least one virtual storage unit by a part or the whole of storage areas of the physical storage units and allowing the host computer to access to the virtual storage unit, the virtualization means sending an access request to one of the centralized modules so as to access to the storage areas of the physical storage units corresponding to an access area of the virtual storage unit when the host computer accesses to the virtual storage unit; means for selecting the centralized module, which is assigned to deal with the largest number of the physical storage units corresponding to the storage area of the virtual storage unit, for the virtual storage unit; and means for assigning the centralized module selected by the selecting means as the object centralized module, to which the virtualization means sends the access request, for the virtual storage unit.

With this structure, the assigning means assigns the centralized module selected by the selecting means as the object centralized module, to which the virtualization means sends the access request and which is assigned to deal with the largest number of the physical storage units corresponding to the storage area of the virtual storage unit. Therefore, most of the access requests can be corresponded to the storage areas corresponding to the assigned centralized module.

In each of the above described computer systems, the storage virtualizer may comprise: means for storing number of times of the access request of each centralized module dealing with the physical storage unit to be accessed, for the virtual storage unit, in a storing section; and means for switching the object centralized module, to which the virtualization means sends the access request, the switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by the assigning means.

Further, the computer system comprises a host computer, a storage system including a plurality of physical storage units and a plurality of centralized modules respectively accessing to the assigned physical storage units, and a storage virtualizer having: a plurality of connecting means for connecting to said host computer and the centralized modules; virtualization means producing at least one virtual storage unit by a part or the whole of storage areas of the physical storage units and allowing the host computer to access to the virtual storage unit, said virtualization means sending an access request to one of the centralized modules so as to access to the storage areas of the physical storage units corresponding to an access area of the virtual storage unit when said host computer accesses to the virtual storage unit; means for assigning one centralized module as the object centralized module, to which said virtualization means sends the access request, for the virtual storage unit; means for storing number of times of the access request of each centralized module dealing with the physical storage unit to be accessed, for the virtual storage unit, in a storing section; and means for switching the object centralized module, to which said virtualization means sends the access request, the switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

With this structure, in the actual operation of the computer system, the switching means switches and sets the centralized module, whose number of times of the access request stored in the storing section is the largest, as the object centralized module for the virtual storage unit. Therefore, most of the access requests can be corresponded to the storage areas corresponding to the assigned centralized module.

The storage virtualizer of a computer, which comprises a host computer and a storage system including a plurality of physical storage units and a plurality of centralized modules respectively accessing to the assigned physical storage units, comprises: a plurality of connecting means for connecting to the host computer and the centralized modules; virtualization means producing at least one virtual storage unit by a part or the whole of storage areas of the physical storage units and allowing the host computer to access to the virtual storage unit, the virtualization means sending an access request to one of the centralized modules so as to access to the storage areas of the physical storage units corresponding to an access area of the virtual storage unit when the host computer accesses to the virtual storage unit; means for selecting the centralized module, which is assigned to deal with the storage areas of the physical storage units having the maximum storage capacity for the storage area of the corresponding virtual storage unit, for the virtual storage unit; and means for assigning the centralized module selected by the selecting means as the object centralized module, to which the virtualization means sends the access request, for the virtual storage unit.

With this structure, the assigning means assigns the centralized module selected by the selecting means as the object centralized module, to which the virtualization means sends the access request and which is assigned to deal with the storage areas of the physical storage units having the maximum storage capacity for the storage area of the corresponding virtual storage unit. Therefore, most of the access requests can be corresponded to the storage areas corresponding to the assigned centralized module.

Another storage virtualizer of a computer, which comprises a host computer and a storage system including a plurality of physical storage units and a plurality of centralized modules respectively accessing to the assigned physical storage units, comprises: a plurality of connecting means for connecting to the host computer and the centralized modules; virtualization means producing at least one virtual storage unit by a part or the whole of storage areas of the physical storage units and allowing the host computer to access to the virtual storage unit, the virtualization means sending an access request to one of the centralized modules so as to access to the storage areas of the physical storage units corresponding to an access area of the virtual storage unit when the host computer accesses to the virtual storage unit; means for selecting the centralized module, which is assigned to deal with the largest number of the physical storage units corresponding to the storage area of the virtual storage unit, for the virtual storage unit; and means for assigning the centralized module selected by the selecting means as the object centralized module, to which the virtualization means sends the access request, for the virtual storage unit.

With this structure, the assigning means assigns the centralized module selected by the selecting means as the object centralized module, to which the virtualization means sends the access request and which is assigned to deal with the largest number of the physical storage units corresponding to the storage area of the virtual storage unit. Therefore, most of the access requests can be corresponded to the storage areas corresponding to the assigned centralized module.

Each of the storage virtualizers may further comprise: means for storing number of times of the access request of each centralized module dealing with the physical storage unit to be accessed, for the virtual storage unit, in a storing section; and means for switching the object centralized module, to which the virtualization means sends the access request, the switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by the assigning means.

Further, another storage virtualizer of a computer, which comprises a host computer and a storage system including a plurality of physical storage units and a plurality of centralized modules respectively accessing to the assigned physical storage units, comprises: a plurality of connecting means for connecting to the host computer and the centralized modules; virtualization means producing at least one virtual storage unit by a part or the whole of storage areas of the physical storage units and allowing the host computer to access to the virtual storage unit, the virtualization means sending an access request to one of the centralized modules so as to access to the storage areas of the physical storage units corresponding to an access area of the virtual storage unit when the host computer accesses to the virtual storage unit; means for assigning one centralized module as the object centralized module, to which the virtualization means sends the access request, for the virtual storage unit; means for storing number of times of the access request of each centralized module dealing with the physical storage unit to be accessed, for the virtual storage unit, in a storing section; and means for switching the object centralized module, to which the virtualization means sends the access request, the switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by the assigning means.

With this structure, in the actual operation of the computer system, the switching means switches and sets the centralized module, whose number of times of the access request stored in the storing section is the largest, as the object centralized module for the virtual storage unit. Therefore, most of the access requests can be corresponded to the storage areas corresponding to the assigned centralized module.

By using the computer system and the storage virtualizer of the present invention, most of the access requests to the virtual storage unit can be sent to the assigned centralized module, which is assigned to deal with the physical storage units to be accessed, so that communication between the centralized modules can be reduced and the storage system can process the access request at high speed.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
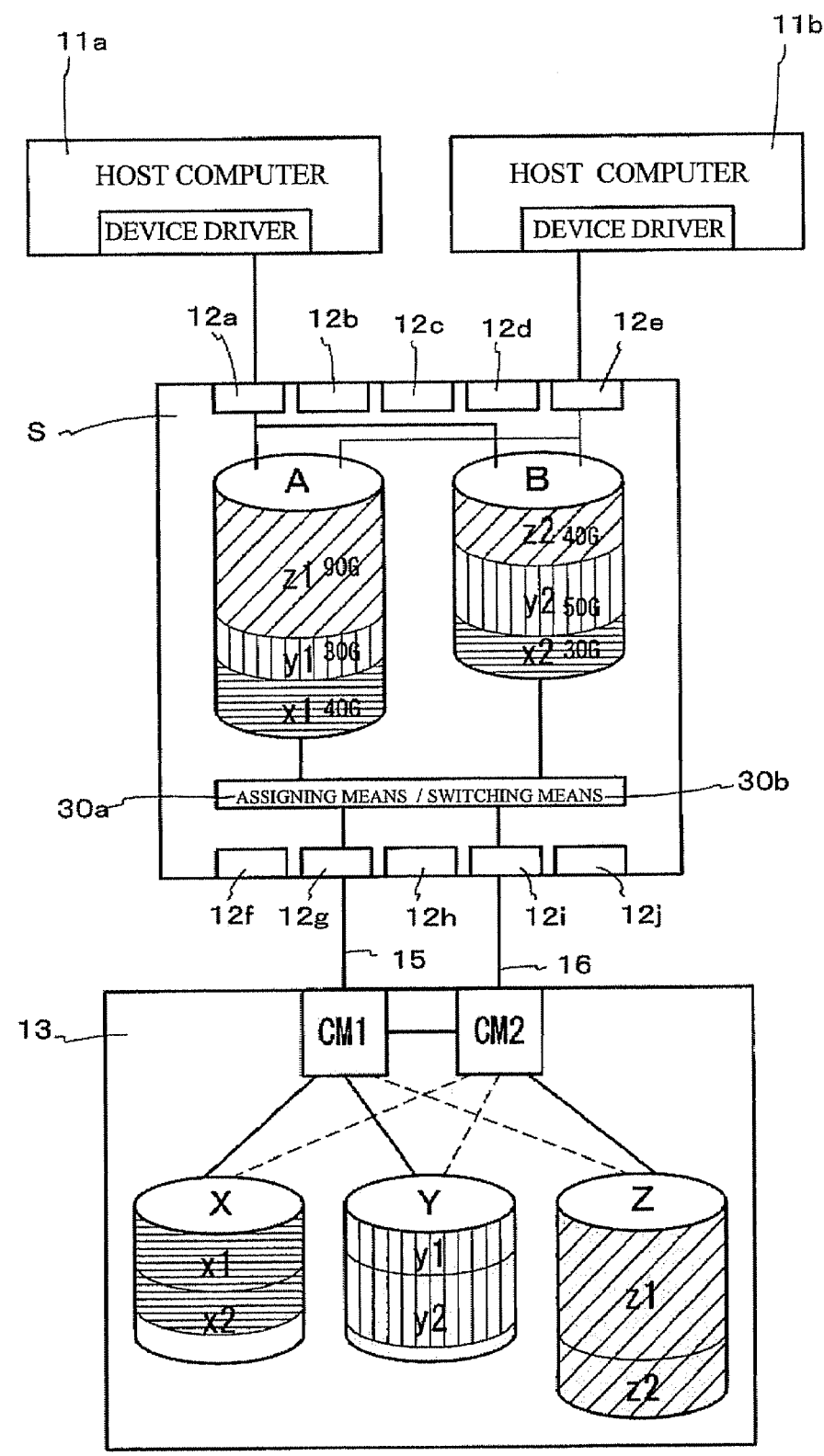
FIG. 1 is a block diagram of an embodiment of a computer system of the present invention.

A computer system of an embodiment of the present invention is shown in FIG. 1. The computer system shown in FIG. 1 comprises a plurality of host computers 11a and 11a, and a storage system 13 including a plurality of physical storage units X, Y and Z.

Figure 5:
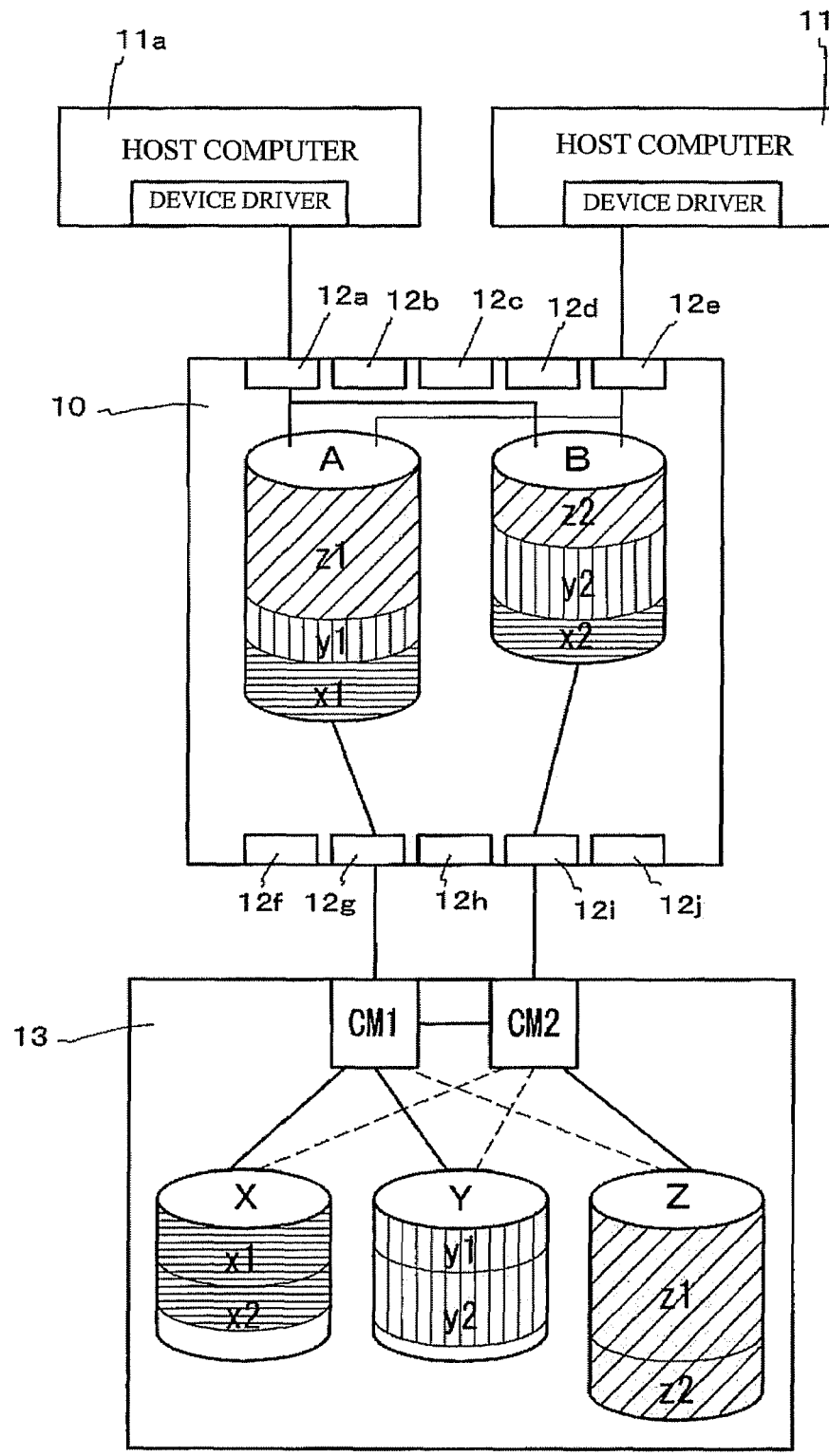
FIG. 5 is a block diagram of further conventional computer system.

A basic structure of the computer system of the present embodiment is similar to that of the described conventional computer system shown in FIG. 5, so the structural elements shown in FIG. 5 are assigned the same symbols and explanation will be omitted. In the present embodiment, a fiber channel switch S, which acts as a storage virtualizer, is used instead of the fiber channel switch 10 shown in FIG. 5.

An example of the storage virtualizer V, which is a substantial part of the computer system of the present embodiment, will be explained.

In FIG. 1, a plurality of host the computers 11a and 11b and the centralized modules CM1 and CM2 of the storage system 13 are respectively connected to the fiber channel switch S, which acts as the storage virtualizer, via the connecting means 12a-12j and fiber channels (FC).

Storage System

The storage system 13 of the computer system has a plurality of the centralized modules CM1 and CM2, which are capable of accessing to the physical storage units X, Y and Z. In the storage system 13, the centralized modules are previously assigned to the physical storage units X, Y and Z for access. In the embodiment shown in FIG. 1, the centralized module CM1 is assigned to the physical storage units X and Y; the centralized module CM2 is assigned to the physical storage unit Z. Note that, paths from the physical storage units to the centralized modules assigned are shown as solid lines; paths from the physical storage units to the centralized modules not assigned are shown as dotted lines.

The centralized modules CM1 and CM2 respectively have cache memories corresponding to stored contents of the designated physical storage units, so that they can rapidly access to the designated physical storage units by using the cache memories.

When the centralized module CM1 receives an access request to the designated physical storage unit X or Y via the path 15 connected to the fiber channel switch S, it accesses to the physical storage unit X or Y.

When the centralized module CM1 receives an access request to the physical storage unit Z designated to the other centralized module CM2 via the path 15, it sends the request to the assigned centralized module CM2. Namely, the centralized modules CM1 and CM2 communicate each other so as to transfer the request to the centralized module CM2.

In the storage system 13, the assigned centralized module always accesses to the designated physical storage unit or units.

As shown in FIG. 1, the centralized modules CM1 and CM2 are connected to the physical storage unit not designated via the paths shown by dotted lines. For example, when the centralized module CM1 breaks down, the physical storage unit X can be accessed via the centralized module CM2.

Fiber Channel Switch

The fiber channel switch S, which acts as the storage virtualizer in the present embodiment, will be explained.

The fiber channel switch S has a control section including a CPU, LSIs, memories, etc. . . The control section 21 executes firmware programs stored in a ROM and functions of the LSIs so as to act as virtualization means 22, first selecting means 24, second selecting means 26, storing means 28, assigning means 30a and switching means 30b.

Virtualization Means

The virtualization means 22 produces the virtual storage units A and B by combining parts or the whole of storage areas of the physical storage units X, Y and Z. The host computers 11a and 11b recognize the virtual storage units A and B. The host computers 11a and 11b can access to the virtual storage units A and B via the fiber channel switch S as well as access to the ordinary physical storage units.

In FIG. 1, the fiber channel switch S combines a part x1 of the physical storage unit X, a part y1 of the physical storage unit Y and a part z1 of the physical storage unit Z so as to produce the virtual storage unit A; the fiber channel switch S combines a part x2 of the physical storage unit X, a part y2 of the physical storage unit Y and a part z2 of the physical storage unit Z so as to produce the virtual storage unit B. The host computer 11a and 11b is capable of accessing to the virtual storage units A and B independently.

The structure of the fiber channel switch S acting as the storage virtualizer is not limited to the example shown in FIG. 1. Parts or the whole of storage areas of the physical storage units may be optionally combined to produce the virtual storage unit.

The virtualization means 22 accesses to actual storage areas of the physical storage units X, Y and Z, on the basis of signals for accessing to the virtual storage units A and B, which are sent from the host computers 11a and 11b, via the paths 15 and 16 and the centralized modules CM1 and CM2.

First Selecting Means

The first selecting means 24 selects the centralized module CM1 or CM2, which is assigned to deal with the storage areas of the physical storage units having the maximum storage capacity for the storage area of the corresponding virtual storage unit, for each of the virtual storage units.

An example will be explained with reference to FIG. 1.

Firstly, the first selecting means 24 obtains data indicating storage capacity of the storage areas x1, y1 and z1 of the physical storage units X, Y and Z, which constitute the virtual storage unit A, from the virtualization means 22. For example, the capacity of the storage area x1 is 40 gigabytes; the capacity of the storage area y1 is 30 gigabytes; and the capacity of the storage area z1 is 90 gigabytes.

Next, the first selecting means 24 calculates storage capacities of the storage areas x1, y1 and z1, which are dealt by the centralized modules CM1 and CM2 respectively. Namely, the centralized module CM1 deals with the storage areas x1 and y1 of the physical storage units X and Y, so the storage capacity dealt by the centralized module CM1 is 70 gigabytes (40 gigabytes of x1 plus 30 gigabytes of y1). On the other hand, the centralized module CM2 deals with the storage area z1 of the physical storage unit Z, so the storage capacity dealt by the centralized module CM2 is 90 gigabytes of z1.

Thus, the first selecting means 24 compares 70 gigabytes of the centralized module CM1 with 90 gigabytes of the centralized module CM2, and selects the centralized module CM2 which deals with the storage areas having greater storage capacity.

Further, the first selecting means 24 executes the similar process for the centralized module CM2. Namely, the centralized module CM1 deals with the storage areas x2 and y2, so the storage capacity dealt by the centralized module CM1 is 80 gigabytes (30 gigabytes of x2 plus 50 gigabytes of y2); the centralized module CM2 deals with the storage area z2, so the storage capacity dealt by the centralized module CM2 is 40 gigabytes of z1. The first selecting means 24 compares 80 gigabytes of the centralized module CM1 with 40 gigabytes of the centralized module CM2, and selects the centralized module CM1 which deals with the storage areas having greater storage capacity.

Assigning Means

The assigning means 30a assigns the centralized modules selected by the first selecting means 24 as the object centralized module, to which the virtualization means 22 sends the access request, for each of the virtual storage units.

In FIG. 1, the assigning means 30a assigns the centralized module CM2 as the object centralized module of the virtual storage unit A, so the virtualization means 22 sends the access request to the virtual storage unit A to the centralized module CM2. On the other hand, the assigning means 30a assigns the centralized module CM1 as the object centralized module of the virtual storage unit B, so the virtualization means 22 sends the access request to the virtual storage unit B to the centralized module CM1.

Since the fiber channel switch S, which acts as the storage virtualizer, has the first selecting means 24 and the assigning means 30a, the access requests are sent to the object centralized module, which deals with the largest storage area of the virtual storage unit, so that most of the access requests will be sent to the object centralized module assigned to the physical storage unit whose storage area constitutes the virtual storage unit. Therefore, transferring the access request between the centralized modules can be reduced, and access performance of the storage system 13 can be improved.

Preferably, the first selecting means 24 and the assigning means 30a are started when a user completely define the structures of the virtual storage units with respect to the fiber channel switch S. At that time, the control section 21 of the fiber channel switch S may automatically start the first selecting means 24 and the assigning means 30a. Further, the user may manually start the first selecting means 24 and the assigning means 30a.

Figure 2:
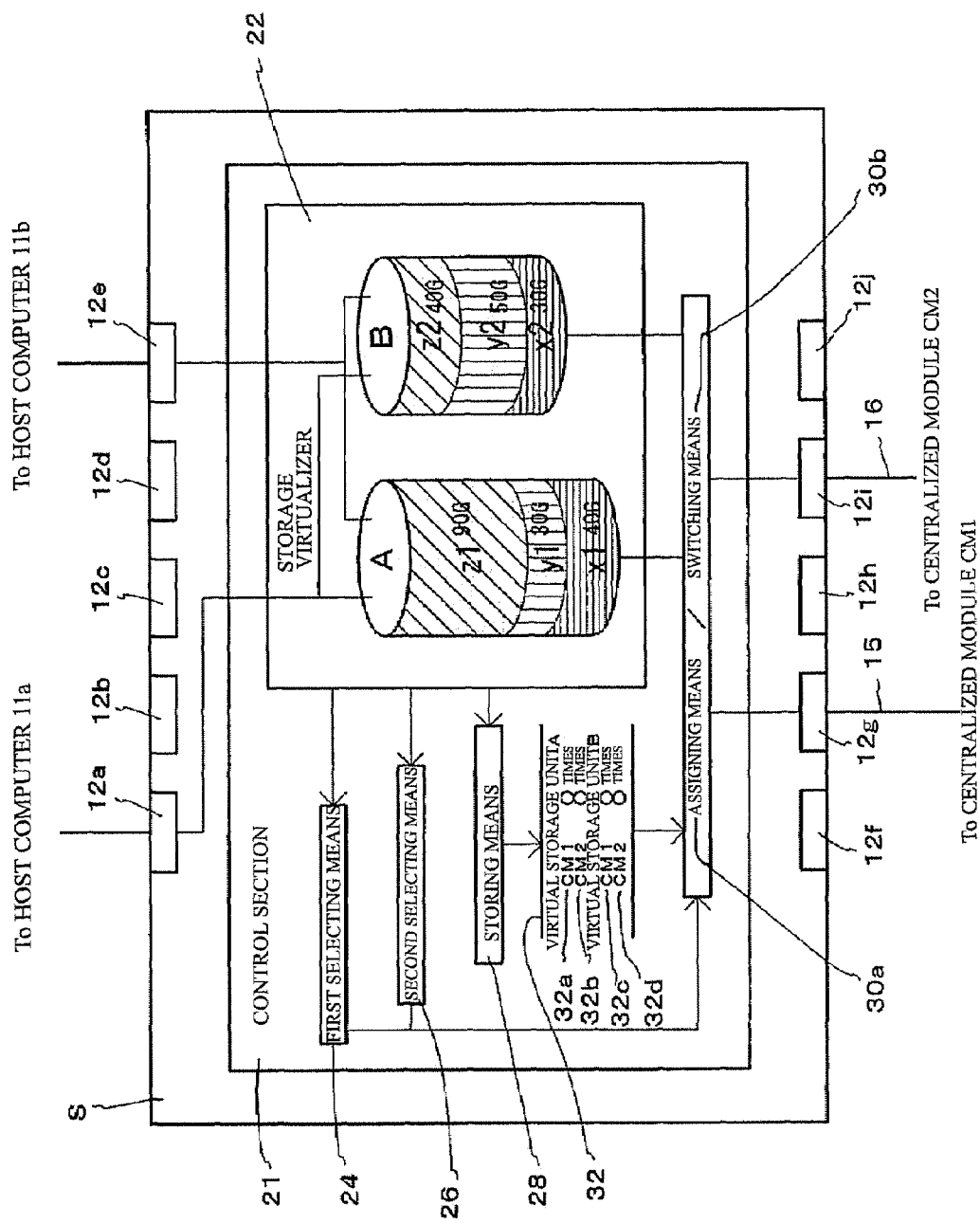
FIG. 2 is a block diagram of a storage virtualizer used in the computer system.
Figure 3:
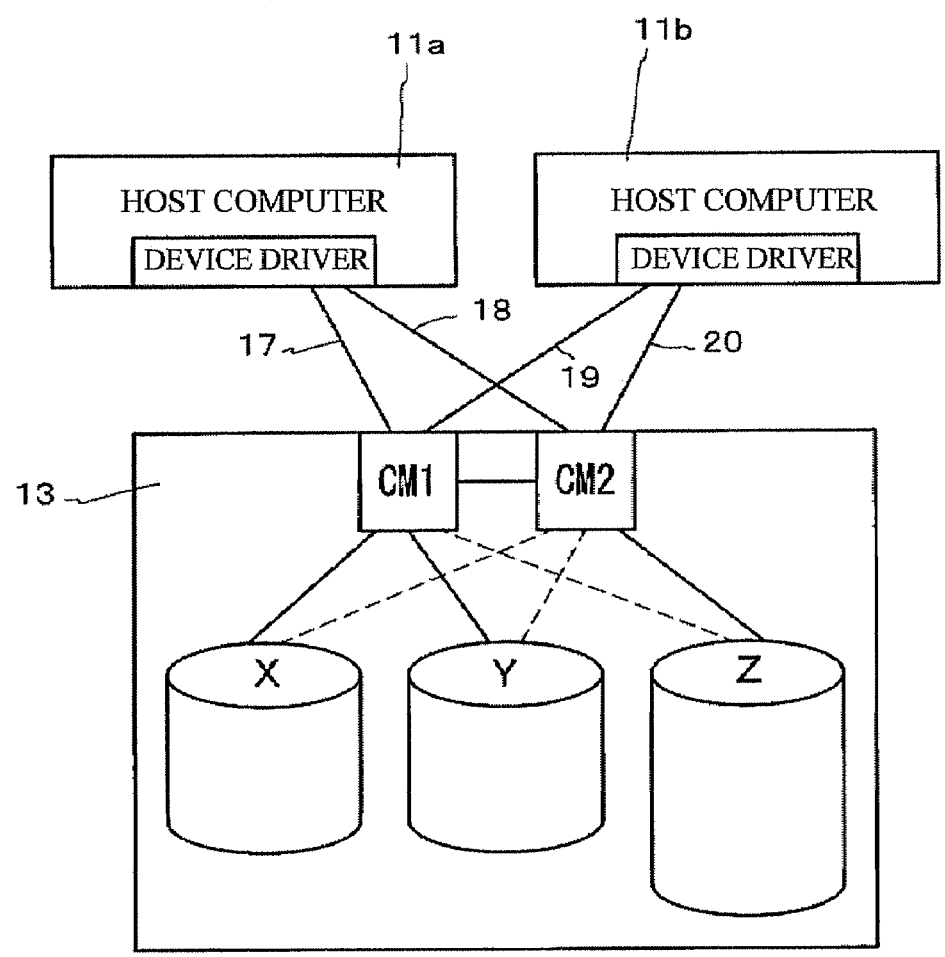
FIG. 3 is a block diagram of the conventional computer system.
Figure 4:
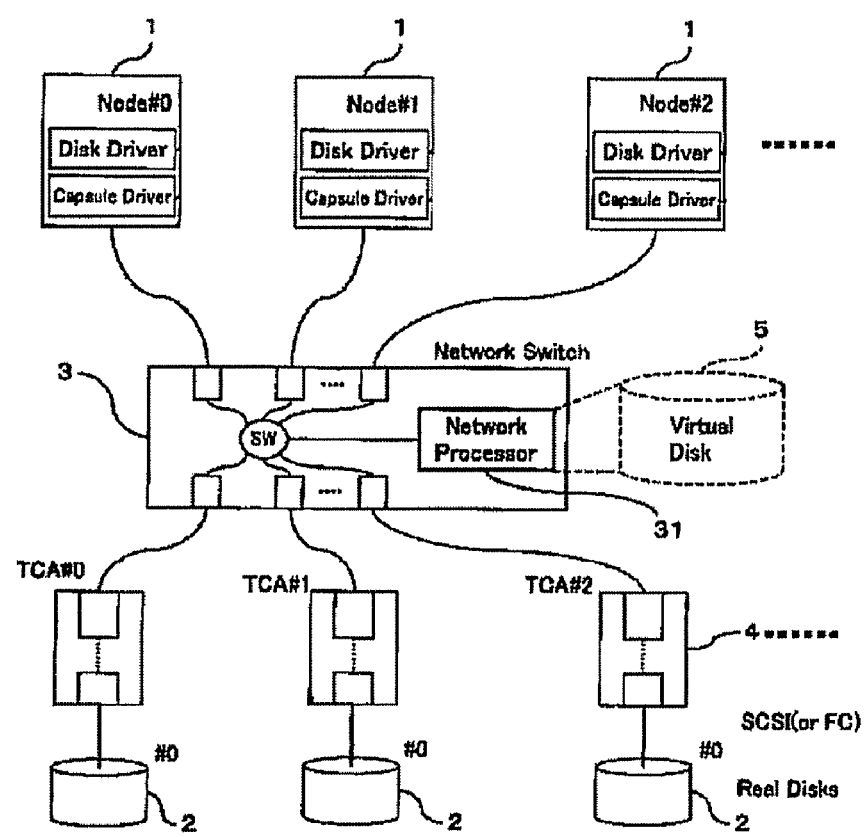
FIG. 4 is a block diagram of another conventional computer system.

The fiber channel switch S may have the second selecting means 26, the storing means 28 and the switching means 30b (see FIG. 2) instead of the first selecting means 24, or they may be included in the fiber channel switch S together with the first selecting means 24.

Note that, the second selecting means 26, the storing means 28 and the switching means 30b will be explained in the following description.

Second Selecting Means

The second selecting means 26 selects the centralized module CM1 or CM2, which is assigned to deal with the largest number of the physical storage units corresponding to the storage area of the virtual storage unit, for each of the virtual storage units.

An example will be explained with reference to FIG. 1.

Firstly, the second selecting means 26 obtains data indicating the physical storage units corresponding to the storage areas x1, y1 and z1 constituting the storage area of the the virtual storage unit A from the virtualization means 22. The physical storage units are X, Y and Z.

Then, the second selecting means 26 selects the centralized module, which is assigned to deal with the largest number of the physical storage units corresponding to the storage area of the virtual storage unit A. In FIG. 1, the centralized module CM1 deals with two physical storage units X and Y; the centralized module CM2 deals with one physical storage unit Z. Therefore, the second selecting means 26 selects the centralized module CM1 as the centralized module dealing with the largest number of the physical storage units, which correspond to the virtual storage unit A.

Similarly, the second selecting means 26 selects the centralized module, which is assigned to deal with the largest number of the physical storage units corresponding to the storage area of the virtual storage unit B. The centralized module CM1 deals with two physical storage units X and Y. Therefore, the second selecting means 26 selects the centralized module CM1 as the centralized module dealing with the largest number of the physical storage units, which correspond to the virtual storage unit B.

In the present embodiment, the both virtual storage units A and B use the storage areas of all physical storage units X, Y and Z. Therefore, the second selecting means 26 selects the centralized module CM1 for the both virtual storage units A and B. In other embodiments, the virtual storage units are not always constituted by same physical storage units. Further, different centralized modules may be assigned to the virtual storage units.

Assigning Means

In the case of using the second selecting means 26, the assigning means 30a assigns the centralized modules selected by the second selecting means 26 as the object centralized module, to which the virtualization means 22 sends the access request, for each of the virtual storage units.

In FIG. 1, the assigning means 30a assigns the centralized module CM1 as the object centralized module of the virtual storage units A and B, so the virtualization means 22 sends the access request to the virtual storage units A and B to the centralized module CM1.

Since the fiber channel switch S, which acts as the storage virtualizer, has the second selecting means 26 and the assigning means 30a, the access requests are sent to the object centralized module, which deals with the largest number of the physical storage units corresponding to the storage area of the virtual storage unit. Therefore, transferring the access request between the centralized modules can be reduced, and the access performance of the storage system 13 can be improved.

Storing Means

The storing means 28 stores number of times of the access request of each centralized module, which deals with the physical storage unit to be accessed, for the virtual storage unit. The numbers of times are stored in a storing section 32.

An example will be explained with reference to FIG. 1.

When the virtualization means 22 requests to access to the storage area z1 of the virtual storage unit A, a datum 32d, which indicates number of access times of the centralized module CM2 for the physical storage unit Z to be accessed and which is stored in the storing section 32, is counted up. On the other hand, when the virtualization means 22 requests to access to the storage area y2 of the virtual storage unit B, a datum 32a, which indicates number of access times of the centralized module CM1 for the physical storage unit Y to be accessed and which is stored in the storing section 32, is counted up.

Note that, in this process, the access requested by the assigning means 30a is not considered.

Namely, the storing means 28 calculates the number of times of the access requests, which are sent to each centralized module assigned to the physical storage units to be accessed, for each of the virtual storage units. The results of the calculation are stored in the storing section 32.

Switching Means

The switching means 30b is started at a prescribed moment. The switching means 30b switches the object centralized module, to which said virtualization means sends the access request. Namely, when the centralized module, whose number of times of the access request stored in the storing section 32 is the largest, is different from the centralized module, which is assigned by said assigning means 30a, the switching means 30b sets the centralized module, whose number of times the access request stored in the storing section 32 is the largest, as the object centralized module for each of the virtual storage units.

For example, in FIG. 1, the first selecting means 24 initially selects the centralized module CM2, to which the access request is sent, for the virtual storage unit A.

After starting the operation of the computer system, the storing means 28 calculates number of times of access requests to each of the centralized modules, and the calculated numbers are stored in the storing section 32.

The switching means 30b are started at a prescribed timing, e.g., once a day, once a week, starting a prescribed operation performed by user. The switching means 30b reads the storing section 32 (32a and 32b) so as to know the centralized module, whose number of times of access requests is the largest, for the virtual storage unit A.

The centralized module CM2 has been initially selected for the virtual storage unit A, by the first selecting means 24, on the basis of the assigned storage capacity included in the storage capacity of the virtual storage unit A. Namely, the storage capacity assigned to the centralized module CM1, which is sum of the storage capacities of the storage areas x1 and y1, is greater than that assigned to the centralized module CM2, which is the storage capacity of the storage area z1, so the centralized module CM2 was selected.

However, in the actual operation of the computer system, number of times of access request to the storage area z1 is not always greater than that to the storage areas x1 and y1. The number of the centralized module CM1 stored in the storing section 32 (32a and 32b) is sometimes greater than that of the centralized module CM2. In this case, the number of times of access requests to the physical storage units X and Y, which are assigned to the centralized module CM1, is greater than that to the physical storage unit Z, which is assigned to the centralized module CM2.

Thus, the switching means 30b sets the centralized module CM1, whose number of times of access requests stored in the storing section 32 is the greatest, as the object centralized module, to which the access request is sent from the virtualization means 22, instead of the centralized module CM2, which was assigned as the object centralized module by the assigning means 30a.

The switching means 30b performs the same process for the virtual storage unit B.

By employing the storing means 28 and the switching means 30b in the fiber channel switch S which acts as the storage virtualizer, the centralized module assigned to the physical storage unit, to which many times of access are actually requested, can be used as the object centralized module.

In the above described embodiment, there are three methods: using the first selecting means 24; using the second selecting means 26; and using the storing means 28. In the three cases, different centralized modules will be selected for one virtual storage unit.

In the present invention, the object centralized module is selected so as to send many of access requests to the object centralized module, which is assigned to the virtual storage unit corresponding to the physical storage unit or units to be accessed on the basis of the access requests. Said difference of the three methods are caused by selecting the storage capacity of the corresponding storage area, the number of the corresponding physical storage or the actual number of times of access requests as a selecting condition. All of the methods are superior methods. The methods may be optionally selected to increase the frequency of accessing to the object centralized module.

Note that, the present invention is not limited to the computer system having the first selecting means, the second selecting means and the storing means. The computer system may have at least one of the means.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a computer system comprising a host computer and a storage system including a plurality of physical storage units and a plurality of centralized modules respectively accessing to the assigned physical storage units,
wherein the improvement comprises a storage virtualizer having:
a plurality of connecting means for connecting to said host computer and the centralized modules;
virtualization means producing at least one virtual storage unit by a part or the whole of storage areas of the physical storage units and allowing said host computer to access to the virtual storage unit, said virtualization means sending an access request to one of the centralized modules so as to access to the storage areas of the physical storage units corresponding to an access area of the virtual storage unit when said host computer accesses to the virtual storage unit;
means for selecting the centralized module, which is assigned to deal with the storage areas of the physical storage units having the maximum storage capacity for the storage area of the corresponding virtual storage unit, for the virtual storage unit; and means for assigning the centralized module selected by said selecting means as the object centralized module, to which said virtualization means sends the access request, for the virtual storage unit.

2. In a computer system comprising a host computer and a storage system including a plurality of physical storage units and a plurality of centralized modules respectively accessing to the assigned physical storage units, wherein the improvement comprises a storage virtualizer having:

a plurality of connecting means for connecting to said host computer and the centralized modules;

virtualization means producing at least one virtual storage unit by a part or the whole of storage areas of the physical storage units and allowing said host computer to access to the virtual storage unit, said virtualization means sending an access request to one of the centralized modules so as to access to the storage areas of the physical storage units corresponding to an access area of the virtual storage unit when said host computer accesses to the virtual storage unit;

means for selecting the centralized module, which is assigned to deal with the largest number of the physical storage units corresponding to the storage area of the virtual storage unit, for the virtual storage unit; and means for assigning the centralized module selected by said selecting means as the object centralized module, to which said virtualization means sends the access request, for the virtual storage unit.

3. The computer system according to claim 1,
wherein said storage virtualizer comprises:

means for storing number of times of the access request of each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times the access request stored in the storing section is the largest, as the object centralized module for the virtual storage unit when the centralized module, whose number of times of the access request stored in the storing section is the largest, is different from the centralized module, which is assigned by said assigning means.

4. The computer system according to claim 2,
wherein said storage virtualizer comprises:

means for storing number of times of the access request of each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

5. In a computer system comprising a host computer and a storage system including a plurality of physical storage units and a plurality of centralized modules respectively accessing to the assigned physical storage units, wherein the improvement comprises a storage virtualizer having:

a plurality of connecting means for connecting to said host computer and the centralized modules;

virtualization means producing at least one virtual storage unit by a part or the whole of storage areas of the physical storage units and allowing said host computer to access to the virtual storage unit, said virtualization means sending an access request to one of the centralized modules so as to access to the storage areas of the physical storage units corresponding to an access area of the virtual storage unit when said host computer accesses to the virtual storage unit;

means for assigning one centralized module as the object centralized module, to which said virtualization means sends the access request, for the virtual storage unit;

means for storing number of times of the access request of each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

6. A storage virtualizer of a computer, which comprises a host computer and a storage system including a plurality of physical storage units and a plurality of centralized modules respectively accessing to the assigned physical storage units, comprising:

a plurality of connecting means for connecting to said host computer and the centralized modules;

virtualization means producing at least one virtual storage unit by a part or the whole of storage areas of the physical storage units and allowing said host computer to access to the virtual storage unit, said virtualization means sending an access request to one of the centralized modules so as to access to the storage areas of the physical storage units corresponding to an access area of the virtual storage unit when said host computer accesses to the virtual storage unit;

means for selecting the centralized module, which is assigned to deal with the storage areas of the physical storage units having the maximum storage capacity for the storage area of the corresponding virtual storage unit, for the virtual storage unit; and means for assigning the centralized module selected by said selecting means as the object centralized module, to which said virtualization means sends the access request, for the virtual storage unit.

7. The storage virtualizer according to claim 6,
further comprising:

means for storing number of times of the access request each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

8. A storage virtualizer of a computer, which comprises a host computer and a storage system including a plurality of physical storage units and a plurality of centralized modules respectively accessing to the assigned physical storage units, comprising:

a plurality of connecting means for connecting to said host computer and the centralized modules;

virtualization means producing at least one virtual storage unit by a part or the whole of storage areas of the physical storage units and allowing said host compute to access to the virtual storage unit, said virtualization means sending an access request to one of the centralized modules so as to access to the storage areas of the physical storage units corresponding to an access area of the virtual storage unit when said host computer accesses to the virtual storage unit;

means for selecting the centralized module, which is assigned to deal with the largest number of the physical storage units corresponding to the storage area of the virtual storage unit, for the virtual storage unit; and means for assigning the centralized module selected by said selecting means as the object centralized module, to which said virtualization means sends the access request, for the virtual storage unit.

9. The storage virtualizer according to claim 8, further comprising:

means for storing number of times of the access request of each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

10. A storage virtualizer of a computer, which comprises a host computer and a storage system including a plurality of physical storage units and a plurality of centralized modules respectively accessing to the assigned physical storage units, comprising:

a plurality of connecting means for connecting to said host computer and the centralized modules;

virtualization means producing at least one virtual storage unit by a part or the whole of storage areas of the physical storage units and allowing said host computer to access to the virtual storage unit, said virtualization means sending an access request to one of the centralized modules so as to access to the storage areas of the physical storage units corresponding to an access area of the virtual storage unit when said host computer accesses to the virtual storage unit;

means for assigning one centralized module as the object centralized module, to which said virtualization means sends the access request, for the virtual storage unit;

means for storing number of times of the access request of each centralized module dealing with the physical storage unit to be accessed, for the virtual storage unit, in a storing section; and means for switching the object centralized module, to which said virtualization means sends the access request, said switching means being started at a prescribed moment and setting the centralized module, whose number of times of the access request stored in the storing section is the largest, as the object centralized module for the virtual storage unit when the centralized module, whose number of times of the access request stored in the storing section is the largest, is different from the centralized module, which is assigned by said assigning means.

* * * * *

UNITED STATES PATENT AND TRADEMARK OFFICE
CERTIFICATE OF CORRECTION

PATENT NO.       : 7,441,009 B2                               Page 1 of 1
APPLICATION NO.  : 11/277648
DATED            : October 21, 2008
INVENTOR(S)      : Atsushi Shinohara It is certified that error appears in the above-identified patent and that said Letters Patent is hereby corrected as shown below:

Column 15, Line 16, change "compute" to --computer--.

Signed and Sealed this

Sixth Day of January, 2009

JON W. DUDAS
*Director of the United States Patent and Trademark Office*